United States Patent
Shi

(10) Patent No.: US 7,553,441 B2
(45) Date of Patent: Jun. 30, 2009

(54) POLYESTER COMPOSITION FOR HOT FILL APPLICATIONS, CONTAINERS MADE THEREWITH, AND METHODS

(75) Inventor: Yu Shi, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 704 days.

(21) Appl. No.: 10/956,510

(22) Filed: Oct. 1, 2004

(65) Prior Publication Data

US 2005/0100696 A1 May 12, 2005

Related U.S. Application Data

(63) Continuation of application No. 10/865,570, filed on Jun. 10, 2004, now abandoned.

(60) Provisional application No. 60/479,314, filed on Jun. 18, 2003.

(51) Int. Cl.
*B29C 39/02* (2006.01)
*B29C 43/02* (2006.01)
*B29C 45/00* (2006.01)
*B29C 47/00* (2006.01)
*B29C 49/00* (2006.01)
*B29C 49/08* (2006.01)
*B29C 67/00* (2006.01)
*B29D 22/00* (2006.01)

(52) U.S. Cl. .................. 264/535; 264/528; 264/532; 264/348; 264/521

(58) Field of Classification Search .................. 264/528, 264/532, 535, 348, 521
See application file for complete search history.

(56) References Cited

U.S. PATENT DOCUMENTS

| | | | |
|---|---|---|---|
| 3,499,873 A | 3/1970 | Kuehne et al. | |
| 3,654,231 A | 4/1972 | Brozek | |
| 3,960,807 A | 6/1976 | McTaggart | |
| 3,989,664 A | 11/1976 | Kawase et al. | |
| 4,250,078 A | 2/1981 | McFarlane et al. | |
| 4,418,116 A | 11/1983 | Scott | |
| 4,420,581 A | 12/1983 | McFarlane et al. | |
| 4,474,918 A | 10/1984 | Seymour et al. | |
| 4,574,148 A | 3/1986 | Wicker et al. | |
| 4,618,515 A | 10/1986 | Collette et al. | |
| 4,665,682 A | 5/1987 | Kerins et al. | |

(Continued)

FOREIGN PATENT DOCUMENTS

EP 0135677 4/1984

(Continued)

OTHER PUBLICATIONS

"Nylon-MXD6 (PA-MXD6)," posted at the Mitsubishi Chemical Inc.'s Website.

(Continued)

*Primary Examiner*—Michael C Miggins
(74) *Attorney, Agent, or Firm*—Sutherland, Asbill & Brennan LLP

(57) ABSTRACT

A container made by reheat stretch blow molding process comprises a poly(ethylene terephthalate) copolymer including levels of diethylene glycol lower than that generated as a byproduct in conventional resin manufacturing process and minor amounts of naphthalenedicarboxylic acid resulting in containers which exhibit enhanced mechanical properties. Methods for making the contains and hot filling the containers are also disclosed.

18 Claims, 2 Drawing Sheets

U.S. PATENT DOCUMENTS

| | | |
|---|---|---|
| 4,820,795 A | 4/1989 | Hirata et al. |
| 4,824,882 A | 4/1989 | Nakamura et al. |
| 4,847,314 A | 7/1989 | Tortorello et al. |
| 4,882,410 A | 11/1989 | Neugebauer et al. |
| 5,021,515 A | 6/1991 | Cochran et al. |
| 5,059,356 A | 10/1991 | Nakamura et al. |
| 5,067,622 A | 11/1991 | Garver et al. |
| 5,162,091 A | 11/1992 | Ishii et al. |
| 5,235,027 A | 8/1993 | Thiele et al. |
| 5,250,333 A | 10/1993 | McNeely et al. |
| 5,281,387 A | 1/1994 | Collette et al. |
| 5,283,295 A | 2/1994 | Light et al. |
| 5,286,557 A | 2/1994 | Jacob et al. |
| 5,302,686 A | 4/1994 | Tanaka et al. |
| 5,362,431 A | 11/1994 | Guerrini et al. |
| 5,378,748 A | 1/1995 | Katsumata et al. |
| 5,405,565 A | 4/1995 | Sumida et al. |
| 5,409,967 A | 4/1995 | Carson et al. |
| 5,409,983 A | 4/1995 | Jones et al. |
| 5,460,903 A | 10/1995 | St. Aubyn Hubbard et al. |
| 5,473,161 A | 12/1995 | Nix et al. |
| 5,475,045 A | 12/1995 | Baker et al. |
| 5,504,128 A | 4/1996 | Mizutani et al. |
| 5,506,014 A | 4/1996 | Minnick |
| 5,573,820 A | 11/1996 | Harazoe et al. |
| 5,582,788 A | 12/1996 | Collette et al. |
| 5,614,141 A | 3/1997 | Sumida et al. |
| 5,631,054 A | 5/1997 | Hosokawa et al. |
| 5,641,548 A | 6/1997 | Yamamoto et al. |
| 5,656,719 A | 8/1997 | Stibal et al. |
| 5,700,554 A | 12/1997 | Speer et al. |
| 5,744,056 A | 4/1998 | Venkateshwaran et al. |
| 5,798,183 A | 8/1998 | Hosono et al. |
| 5,888,598 A | 3/1999 | Brewster et al. |
| 5,925,710 A | 7/1999 | Wu et al. |
| 5,939,516 A | 8/1999 | Greaves et al. |
| 5,945,460 A | 8/1999 | Ekart et al. |
| 5,948,864 A | 9/1999 | Rajagopalan |
| 5,976,653 A | 11/1999 | Collette et al. |
| 5,980,797 A | 11/1999 | Shelby et al. |
| 6,019,933 A | 2/2000 | Takada et al. |
| 6,060,140 A | 5/2000 | Sprayberry et al. |
| 6,071,599 A | 6/2000 | Kosuge et al. |
| 6,077,904 A | 6/2000 | Dalgewicz et al. |
| 6,099,778 A | 8/2000 | Nelson et al. |
| 6,150,450 A | 11/2000 | Sekiyama et al. |
| 6,150,454 A | 11/2000 | Wu et al. |
| 6,180,749 B1 | 1/2001 | Kim et al. |
| 6,230,547 B1 | 5/2001 | Carroll, Jr. |
| 6,276,994 B1 | 8/2001 | Yoshida et al. |
| 6,284,866 B1 | 9/2001 | Schiavone |
| 6,309,718 B1 | 10/2001 | Sprayberry et al. |
| 6,320,014 B1 | 11/2001 | Takahashi et al. |
| 6,333,363 B1 | 12/2001 | Imashiro et al. |
| 6,335,422 B2 | 1/2002 | Schiavone |
| 6,344,166 B1 | 2/2002 | Aoki et al. |
| 6,355,319 B1 | 3/2002 | Nakamachi et al. |
| 6,458,314 B1 | 10/2002 | Al Ghatta |
| 6,485,804 B1 | 11/2002 | Nakamachi et al. |
| 6,489,386 B1 | 12/2002 | Plotzker et al. |
| 7,226,648 B2 | 6/2007 | Al Ghatta et al. |
| 2001/0034431 A1 | 10/2001 | Schiavone |
| 2002/0010285 A1 | 1/2002 | Nakamachi |
| 2002/0119267 A1 | 8/2002 | Himmelmann et al. |
| 2002/0128427 A1 | 9/2002 | Schaaf et al. |
| 2002/0198331 A1 | 12/2002 | Nishihara et al. |
| 2003/0001317 A1 | 1/2003 | Stafford et al. |
| 2003/0099794 A1 | 5/2003 | Sasaki et al. |
| 2003/0116526 A1 | 6/2003 | Mehanna |
| 2004/0013893 A1 | 1/2004 | Nakaya et al. |
| 2004/0091651 A1 | 5/2004 | Rule et al. |
| 2004/0116619 A1 | 6/2004 | Moad et al. |
| 2004/0236065 A1 | 11/2004 | Denis et al. |
| 2005/0118371 A1 | 6/2005 | Shi et al. |
| 2005/0153084 A1 | 7/2005 | Shi et al. |
| 2005/0221036 A1 | 10/2005 | Shi |
| 2005/0260371 A1 | 11/2005 | Shi et al. |
| 2006/0257602 A1 | 11/2006 | Shi |
| 2006/0257603 A1 | 11/2006 | Shi et al. |

FOREIGN PATENT DOCUMENTS

| | | |
|---|---|---|
| EP | 0 356 343 | 2/1990 |
| EP | 0395233 | 10/1990 |
| EP | 0395237 | 10/1990 |
| EP | 0 415 859 | 3/1991 |
| EP | 0 532 988 | 3/1993 |
| EP | 0 549 338 | 6/1993 |
| EP | 0 554 950 | 8/1993 |
| EP | 0678554 | 10/1995 |
| EP | 0 897 794 | 2/1999 |
| EP | 0 707 625 | 4/1999 |
| EP | 0 926 197 A1 | 6/1999 |
| EP | 1433817 | 6/2004 |
| EP | 1518876 | 3/2005 |
| JP | 54154468 A | 12/1979 |
| JP | 5-255492 | 10/1993 |
| JP | 5-293878 | 11/1993 |
| JP | 7-268085 | 10/1995 |
| JP | 0-076336 | 3/1997 |
| JP | 9-76336 | 3/1997 |
| JP | 2002321273 | 11/2002 |
| JP | 2003127211 | 5/2003 |
| JP | 2003159739 | 6/2003 |
| JP | 2003300209 | 10/2003 |
| NL | 1006498 | 1/1999 |
| WO | WO 91/02111 | 2/1991 |
| WO | WO 94/01268 | 1/1994 |
| WO | 98/41559 | 9/1998 |
| WO | 01/56896 | 8/2001 |
| WO | WO 01/83193 A1 | 11/2001 |
| WO | WO 03/008293 A1 | 1/2003 |
| WO | 2005/014254 | 2/2004 |
| WO | WO 2004/041496 A1 | 5/2004 |
| WO | 2004/113414 | 12/2004 |

OTHER PUBLICATIONS

Maeda, Y., et al., "Effect of Antiplasticization on Gas Sorption and Transport. I. Polysulfone," Journal of Polymer Science: Part B: Polymer Physics, vol. 25, 957-980 (1987).

Maeda, Y., et al., "Effect of Antiplasticization on Gas Sorption and Transport. II. Polysulfone," Journal of Polymer Science: Part B: Polymer Physics, vol. 25, 981-1003 (1987).

Maeda, Y., et al., "Effect of Antiplasticization on Gas Sorption and Transport. III. Polysulfone," Journal of Polymer Science: Part B: Polymer Physics, vol. 25, 1005-1016 (1987).

Maxwelli, et al., "Secondary relaxation processes in polyethylene terephthalate-additive blends: 2. Dynamic mechanical and dielectric investigations," Polymer, vol. 39, No. 26, 6851-6859 (1998).

Robeson, L. M., et al., "Secondary Loss Transitions in Antiplasticized Polymers," Polymer Science, Part B, vol. 7, 35-40 (1969).

Sakellarides, Stefano, "Modifying PET Crystallization to Improve Container Processing," Plastics Engineering 33-35 (Dec. 1996).

Van Krevelen, D. W., "Properties of Polymers: Their Correlation with Chemical Structure; Their Numerical Estimation and Prediction from Additive Group Contributions," Elsevier Science B.V., Third Completely Revised Revision (1997).

MPS Europe, "Molding of PET Containers," http://www.mps-europe.com/pet-containers.php (Aug. 22, 2008).

POLYESTER COMPOSITION FOR HOT FILL APPLICATIONS, CONTAINERS MADE THEREWITH, AND METHODS

CROSS REFERENCE TO RELATED APPLICATION

This application claims priority under 35 U.S.C. §119 to U.S. provisional patent application Ser. No. 60/479,314 filed on Jun. 18, 2003. U.S. patent application Ser. No. 10/865,570 filed in the U.S. Patent and Trademark Office on Jun. 10, 2004 now abandoned.

FIELD OF THE INVENTION

The present invention pertains to polyester compositions which are particularly suitable for the manufacture of heat-set formed articles, such as beverage containers that are used in hot-fill applications. More specifically, the present invention is related to poly(ethylene terephthalate)-based resin compositions that contain levels of diethylene glycol lower than that generated as a by-product in the conventional resin manufacturing process and minor amounts of naphthalenedicarboxylic acid resulting in containers which exhibit enhanced mechanical properties.

BACKGROUND OF THE INVENTION

Poly(ethylene terephthalate)-based resins, which are commonly referred to in the industry simply as "PET" even though they may and often do contain minor amounts of additional components, have widely been used to make containers for carbonated soft drinks and water due to being light weight and having an excellent combination of mechanical and gas barrier properties. In these traditional applications, the contents of the container are at ambient temperature or cold when introduced into the container ("cold-fill process"). Recently, PET containers have been used beyond such applications and have been used in applications for beverages such as juices, flavored sports drink, and teas, in which the contents of the container are at an elevated temperature when introduced into the container ("hot-fill process").

The hot-fill process subjects the containers to a high temperature treatment when the beverage is placed in the containers. This high temperature treatment causes unacceptable shrinkage or deformation of PET containers that are produced under conventional preform injection molding and container stretch blow molding processes used to make cold-filled containers. For PET containers to be used in hot-fill processes, several solutions have been developed to eliminate shrinkage and deformation. Such solutions include converting preforms into containers using a heat-set stretch blow molding (SBM) process, designing bottles with special vacuum panels, using special grades of PET resins or combinations of these. Preforms are test tube shaped articles prepared by injection molding of the PET using technology well know in the art.

In the heat-set SBM process, preforms are heated to a temperature of about 90° C. to about 140° C., which is above the glass transition temperature of the polymer, and then placed into molds heated at temperatures of about 60° C. to about 200° C. Pressurized gas is injected or blown into the heated preforms expanding and stretching the preform onto the mold surface ("stretch blowing step"). Differences between the heat-set and the non-heat-set SBM processes are that, in heat-set processes, heated molds are used rather than ambient or cold molds of about 10° C., the preform is heated a sufficient time to allow for the preform to reach a substantially uniform temperature prior to stretching, and the stretch blowing step is slowed relative to typical speed used to manufacture non-heat-set SBM containers. The speed is slowed to allow for a long contact time between the blow mold and the forming container. The heat-set SBM process uses more energy and requires more time than a non-heat-set SBM process, thus increasing the manufacturing costs of heat-set containers. Containers made by conventional heat-set SBM processes can be hot-filled to a temperature of about 85° C. without severe shrinkage.

The hot-fill temperature requirements, however, are increasing and, in some instances, to beyond the normal PET glass transition temperature. Since the hot-fill temperature is related to both crystallinity of the container sidewall and the glass transition temperature of the polyester, several methods have been used to achieve even higher hot-fill temperatures. One method is the use of special heat-set SBM processes. For example, a double-blow heat-set SBM process enables high crystallinity of more than thirty five percent based on density measurement to develop in the sidewall allowing for hot-filling to above 90° C. However, in this process the manufacturing speed is dramatically slower because of the double stretch blowing step and results in an increased cost to produce the higher temperature hot-fill containers.

Another method uses specially designed resins that have property or co-monomer modification. These special PET resins have higher glass transition temperatures, can achieve higher crystallinity during the heat-set SBM process or a combination of both. In one example, the molecular weight of the PET resin is increased to reduce both preform gravitational deformation and the natural stretch ratio of the PET resin. However, increasing molecular weight increases the manufacturing cost of the PET resin and often increases the preform injection molding cycle time due to increased injection temperature of the more viscous materials.

Several co-monomers have been used to modify PET resins to obtain higher glass transition temperatures, including diacids such as naphthalene dicarboxylic acid (NDA), diols such as 1,4-cyclohexanedimethanol (CHDM) or a combination of both. The total modification for NDA is typically above 5 mole percent to get the desired results. This high level of modification, however, changes the stretching behavior and the crystallization behavior of the polyester such that very thick side-walled preforms have to be designed and/or the process has to be slowed down to achieve the high degree of crystallinity needed. In another specially designed resin, the PET resin has reduced co-monomer content such that the polymer is essentially a homo-polymer except for the presence of naturally occurring diethylene glycol at about 2.8 mole percent. Although the crystallization rate is dramatically improved and high crystallinity can be achieved, the crystallization is too fast such that the preforms tend to be hazy and thus the containers are hazy. The containers also do not achieve the desired optimal material distribution due to the difficulty in blow molding the crystallized preforms resulting in undesirable containers. In still another specially designed resin, only the diol component of the PET resin is modified with 1-4 mole percent CHDM and 1-4 mole percent diethylene glycol (DEG) and the PET resin contains reheat additives such as carbon black, iron oxide, antimony metals, and the like. Reheat refers to heating the preform prior to the stretch blowing step. The term "reheat" is used in the industry because at this stage the polymer has previously been heated during formation of the preform and is now undergoing reheat to form the container.

To achieve the mechanical properties needed to survive the high temperature and subsequent vacuum conditions of the hot-filling process, PET containers are designed to have very thick side walls. Such thick-walled bottles are blown from thick-walled preforms. Since the injection molding cooling time is proportional to the square of the preform sidewall thickness, heat-set containers tend to have much higher cycle time, i.e. much lower productivity, than non-heat-set containers during injection molding. Time to reheat the thick-walled preform in the blow molding process is also increased. Further, the thick-walled bottles also mean more material has to be used to produce the bottles. This can cause environmental awareness in source reduction of both material and energy usage.

Thus, there is a need in the art for PET resins that can be used to make hot-fill containers capable of being filled at 85° C. or higher filling temperatures, that have modifications low enough that the stretch ratio and the crystallization rate of the PET are not increased and the corresponding preforms are clear, that can be utilized in conventional high speed heat-set SBM processes, and that can be used to produce hot-fill containers with reduced weight resulting in reduced energy usage via reduced cycle time. Accordingly, it is to the provision of such that the present invention is directed.

SUMMARY OF THE INVENTION

This invention addresses the above-described needs by providing for PET resins that can be used to make hot-fill containers withstanding temperatures above 85° C. and/or lighter weight containers made from preforms with thinner walls than conventional preforms used in heat-set SBM processes. Embodiments of this invention provide hot-fill containers exhibiting improved stiffness and reduced shrinkage at a filling temperature above 85° C. For applications with lower temperature filling requirements, containers made in accordance with embodiments of this invention have wall thickness from 5 to 20% less than containers made with conventional PET resins.

Thus, this invention encompasses a container made by a heat-set SBM process comprising a poly(ethylene terephthalate) copolymer (PET copolymer) consisting essentially of a diacid component having repeat units from about 95 to about 99.75 mole percent terephthalic acid and from about 5 to about 0.25 mole percent naphthalenedicarboxylic acid and a diol component having repeat units from greater than about 98.2 mole percent ethylene glycol and less than about 1.8 mole percent diethylene glycol. The mole percentages are based on 100 mole percent diacid component and 100 mole percent diol component. This definition is applicable to mole percentages throughout this specification. The PET copolymer has an intrinsic viscosity of about 0.6 to about 1.2 dL/g.

In another embodiment of the present invention, a heat-set SMB process for producing a container comprises the steps of:
(1) heating a preform comprising a poly(ethylene terephthalate) copolymer (PET copolymer) to a temperature of between above the glass transition temperature of the PET copolymer to about 140° C., wherein the PET copolymer consists essentially of a diacid component having repeat units from about 0.95 to about 99.75 mole percent terephthalic acid and from about 5 to about 0.25 mole percent naphthalenedicarboxylic acid and a diol component having repeat units from greater than about 98.2 mole percent ethylene glycol and less than about 1.8 mole percent diethylene glycol, based on 100 mole percent diacid component and 100 mole percent diol component;
(2) positioning the preform in a mold heated to a temperature from about 60° C. to 200° C.;
(3) stretching and expanding the heated preform into the heated mold to form a container; and
(4) cooling the container.

In still another embodiment of the present invention a process for hot filling a heat-set container comprises the steps of:
(1) heating a preform comprising a PET copolymer to temperature of between above the glass transition temperature of the PET copolymer to about 140° C., wherein the PET copolymer consists essentially of a diacid component having repeat units from about 95 to about 99.75 mole percent terephthalic acid and from about 5 to about 0.25 mole percent naphthalenedicarboxylic acid and a diol component having repeat units from greater than about 98.2 mole percent ethylene glycol and less than about 1.8 mole percent diethylene glycol, based on 100 mole percent diacid component and 100 mole percent diol component;
(2) positioning the preform in a mold heated to a temperature from about 60° C. to about 200° C., preferably from about 90° C. to about 160° C.
(3) stretching and expanding the heated preform into the heated mold to form a container;
(4) cooling the container, and
(5) filling the container with a liquid heated above 75° C.

In still another embodiment of the present invention, a process for hot filling a heat-set SBM container at temperatures above 87° C. comprises the steps of:
(1) conducting a single stage stretch blow molding process to form a container from a preform comprising the steps of:
  (a) heating a preform comprising a polyester to a temperature above the glass transition temperature of the polyester,
  (b) heating a container mold to a temperature of from about 60° C. to about 200° C., preferably from about 90° C. to about 160° C.
  (c) placing the heated preform into the heated mold,
  (d) stretching and expanding into the heated mold to form a container; and
  (e) cooling the container, and
(2) filling the container with a liquid at a temperature above 87° C.

Other objects, features, and advantages of this invention will become apparent from the following detailed description, drawings, and claims.

DETAILED DESCRIPTION OF THE INVENTION

Figure 1:
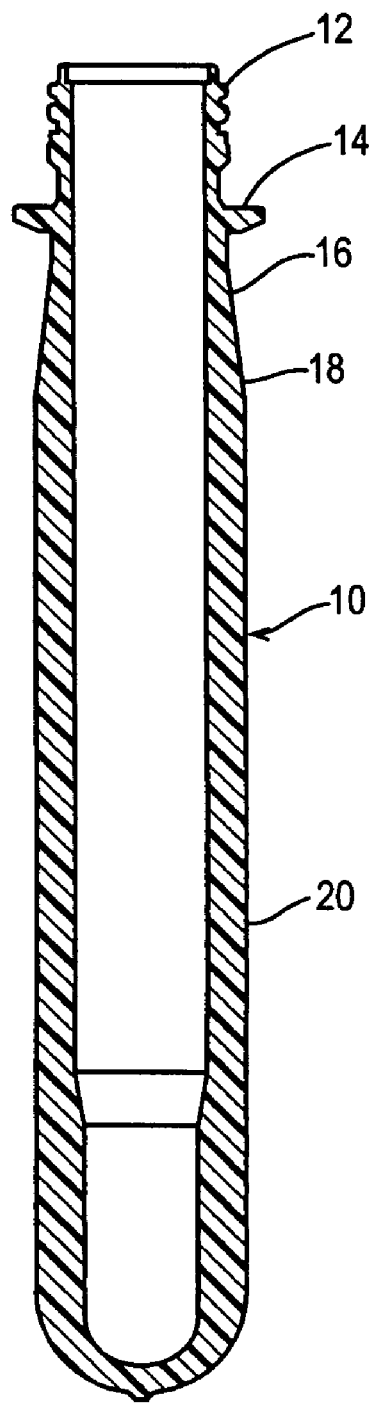
FIG. 1 is sectional elevation view of a molded container preform made in accordance with an embodiment of this invention.

This invention encompasses containers made by reheat stretch blow molding a PET copolymer including an amount of diethylene glycol lower than that generated as a byproduct in the conventional resin manufacturing process and minor amounts of naphthalenedicarboxylic acid such that the containers exhibit enhanced mechanical properties. This invention also encompasses methods for making such containers and methods for hot filling such containers. Thus, preferred embodiments of this invention are particularly useful for hot filling applications, although they can be made at a lighter weight for use in cold filling processes. Embodiments of this invention can take the form of a variety of types of containers including but not limited to bottles, drums, carafes, coolers, and the like.

In accordance with an embodiment of the present invention, a poly(ethylene terephthalate) copolymer (PET copolymer) is made into an injection molded preform which is then stretch blow molded into a hot-fill container utilizing a heat-set SBM process. In one embodiment, the invention is a container made by a heat-set SBM process comprising a poly(ethylene terephthalate) copolymer (PET copolymer) consisting essentially of a diacid component having repeat units from about 95 to about 99.75 mole percent terephthalic acid and from about 0.25 to about 5 mole percent naphthalenedicarboxylic acid (NDA) and a diol component having repeat units from greater than about 98.2 mole percent ethylene glycol and less than about 1.8 mole percent diethylene glycol (DEG). The mole percentages are based on 100 mole percent diacid component and 100 mole percent diol component. The heat-set SBM process is well known in the art and generally comprises steps of heating the preform to a temperature from above the glass transition temperature of the PET copolymer to about 140° C., and preferably from about 90° C. to about 140° C., blowing preforms into a mold heated to a temperature from about 60° C. to about 200° C., and preferably from about 90° C. to about 160° C., by injecting air into the preform to form a container with higher crystallinity and relaxed amorphous orientation resulting in lower shrinkage in subsequent hot fill processing.

In PET copolymer used in preferred embodiments, repeat units from naphthalenedicarboxylic acid are present in an amount from above about 0.25 to about 2.5 mole percent, more preferably from above about 0.25 to about 1.0 mole percent, and even more preferably from above about 0.25 to about 0.75 mole percent. The repeat units of naphthalenedicarboxylic acid may be derived from the diacid or diester thereof depending on the PET copolymer manufacturing process. Preferably, 2,6-naphthalenedicarboxylic acid is used. Also in preferred embodiments, the repeat units from diethylene glycol are present in the PET copolymer in an amount from less than about 1.6 mole percent, and more preferably less than about 1.4 mole percent. Since diethylene glycol is a by-product of the polyester manufacturing process for PET, obtaining a PET resin 10 with 0 mole percent diethylene glycol has not been possible. Thus, the present invention contemplates an amount of diethylene glycol present in the PET copolymer of less than a certain amount rather than having a low range of zero mole percent.

The PET copolymer of preferred embodiments of this invention preferably has an intrinsic viscosity (IV) of from about 0.6 to about 1.2 dL/g, more preferably from about 0.7 to about 0.9 dL/g, and even more preferably from about 0.76 to about 0.87 dL/g. IV is measured according to ASTM D4603-96 wherein samples of preform are ground and dissolved using a 60/40 phenol/tetrachloroethane solution, with a concentration of 0.50% and measured at a temperature of 30 C.

The PET copolymers of preferred embodiments of the present invention exhibit higher levels of strain induced crystallinity and increased mechanical properties but at the same time, keep the clarity of the preforms. When resins compositions of these PET copolymers are molded into preforms, the resultant hot-fill containers exhibit improved shrinkage behavior and maintain or increase crystallinity, even when the preforms possess lower stretch ratios than those preforms made with conventional PET.

Those skilled in the art of PET manufacture generally regard diethylene glycol (DEG) as a harmless by-product of the polymer manufacture; consequently, little effort has been directed toward reduction of DEG levels in PET intended for use in hot-fill containers, especially when the approach of using higher levels of comonomer to modify PET has been used to provide hot-fill grade PET. The DEG level produced in normal processes is at levels between 2.5 and 4.0 mole percent. Some effort has been used to control the DEG level, which is believed to give enhanced thermal stability of the PET with higher glass transition temperatures. A higher level of another modifier (normally IPA) has to be used such that the thermal crystallization rate is controlled to achieve clear, thick preforms in the injection molding process. In fact, some efforts have been directed toward increasing the DEG content of PET since, at levels between 2.5 and 4.0 mole percent, increasing DEG content is considered to cause an increase in crystallization rates, which is sometimes desirable from a polymer production standpoint. The rationale for this phenomenon is that the increased polymer chain flexibility resulting from the higher DEG content allows for more rapid ordering and packing of the polymer chains into polymer crystals.

Contrary to expectations as discovered in the present invention, reducing the DEG content to less than about 1.8 mole percent in the PET copolymer results in an increase in crystallization rate relative to PET containing between 2.1 and 2.9 mole percent DEG. Further, the addition of low levels of NDA has been discovered to enhance the stiffness of the PET chains and results in an unexpected increase in the sidewall rigidity of the containers made from the PET copolymer, without having an adverse impact on the viscosity of the polymer melt. The low levels of NDA are enough to hinder the thermal crystallization rate such that clear thick preforms can be produced in the injection molding process.

As noted above, methods for producing conventional PET generate DEG in amounts greater than 2.2 mole percent. Thus, modifications to the PET production process must occur to achieve the lower DEG levels in the PET copolymer for preferred embodiments of the present invention. Any method suitable for reducing DEG content of polyester can be employed. Suitable methods include reducing the mole ratio of diacid or diester relative to ethylene glycol in the esterification or transesterification reaction; reducing the temperature of the esterification or transesterification reaction, addition of DEG-suppressing additives, including tetra-alkyl ammonium salts and the like; and reduction of the DEG content of the ethylene glycol that is recycled back to the esterification or transesterification reaction.

In the conventional process of making containers, PET pellets that are obtained from a conventional polyester esterification/polycondensation process are heated and subsequently made into preforms through an injection molding process. The preforms are heated through an oven to the temperature between glass transition temperature and crystallization temperature and then formed into containers via a stretch blow molding process. Heating the preform prior to stretch blow molding is commonly referred to in the industry as "reheating" or "conditioning" the preform. An important consideration in producing clear containers is a minimization of thermal crystallization of the PET preforms. Thermally induced crystallization tends to form large crystallites in PET, with a concomitant formation of haze. In contrast, strain-induced crystallinity occurring during blow molding forms very small crystals so that the containers are still transparent.

Traditional heat-set PET containers have either too little modifier, which cause higher thermal crystallization rate and thus hazy preforms, or too much modifier, which has lower crystallization rate and higher stretch ratio than the present invention.

Heat-set containers may be produced from PET copolymer compositions in accordance with embodiments of the present invention using known injection molding and stretch blow molding processes. These known procedures involve the steps of 1) injection molding the polyester composition to form a preform and 2) stretch blow molding a heated preform into a container against a heated blow mold. The typical preform temperature is from about 90° C. to 130° C. prior to blow molding, and the typical blow mold temperature is from about 60° C. to 200° C., and preferably from 90° to 160° C. During contact with the blow mold, the crystallinity of the container sidewall is increased and the amorphous orientation induced by blow molding is reduced. The specific type of process used is determined by the volume of the production or the production rate desired for a specific application and the machine design and the capabilities.

Thus, in another embodiment of the present invention, a heat-set SBM process for producing a container comprises the steps of:
(1) heating a preform comprising a poly(ethylene terephthalate) copolymer (PET copolymer) to a temperature of between above the glass transition temperature of the PET copolymer to about 140° C., wherein the PET copolymer consists essentially of a diacid component having repeat units from about 95 to about 99.75 mole percent terephthalic acid and from about 5 to about 0.25 mole percent naphthalenedicarboxylic acid and a diol component having repeat units from greater than about 98.2 mole percent ethylene glycol and less than about 1.8 mole percent diethylene glycol, based on 100 mole percent diacid component and 100 mole percent diol component;
(2) positioning the preform in a mold heated to between about 60° C. to about 200° C., and preferably about 90° C. to about 160° C., and more preferably about 100° C. to 140° C.;
(3) stretching and expanding the heated preform through an open end into the heated mold to form a container; and
(4) cooling the container.

In still another embodiment of the present invention a process for hot filling a heat-set container comprises the steps of:
(1) heating a preform comprising a PET copolymer to temperature of between above the glass transition temperature of the PET copolymer to about 140° C., wherein the PET copolymer consists essentially of a diacid component having repeat units from about 95 to about 99.75 mole percent terephthalic acid and from about 5 to about 0.25 mole percent naphthalenedicarboxylic acid and a diol component having repeat units from greater than about 98.2 mole percent ethylene glycol and less than about 1.8 mole percent diethylene glycol, based on 100 mole percent diacid component and 100 mole percent diol component;
(2) positioning the preform in a mold heated to a temperature from about 60° C. to about 200° C., and preferably from about 90° C. to about 160° C., and more preferably from about 100° C. to about 140° C.;
(3) injecting a pressurized gas into the heated preform through an open end causing the preform to stretching and expanding the heated preform into the heated mold to form a container;
(4) cooling the container, and
(5) filling the container with a liquid heated above 75° C.

Preferably in both of the above processes, the preform is heated to a substantially uniform temperature along the length and across the width of the preform prior to positioning the preform in the mold and stretching and injecting the pressurized gas to stretch the preform radially and longitudinally. The longitudinal stretching can be assisted by a stretching rod. The term "substantially uniform temperature" is meant to include the existence of temperature gradients in the preform sidewall. Desirably, the preform is heated for a period of time from about 20 seconds to about 2 minutes and is preferably heated for less than one minute. This heating time includes time for actual application of heat and time for the heat to "soak" through the preform. Further, the PET copolymer composition has the preferred amounts of repeat units of NDA and DEG as described above.

In another embodiment, the container is preferably hot filled with a liquid that is heated to above 85° C., preferably above 90° C., and even more preferably above 93° C. To utilize particular embodiments of the present invention to their fullest potential, one skilled in the art has the option of either filling the heat-set container made in accordance with an embodiment of the present invention with liquid at higher temperatures of above 90° C. utilizing preforms and containers with conventional wall thicknesses or lightweighting the heat-set container utilizing preforms and containers with thinner walls than previously known in the art and filling the liquid at lower temperatures of about 75° C. to 85° C. Lightweighting also equates to faster blow process without need for a reheat agent to attain conventional speeds. The container wall thickness can be reduced by about 5 to about 20 percent over conventional hot fill containers.

With respect to the amounts of comonomer in the PET copolymer, the examples herein compare the present invention PET copolymer with other resin compositions. Specifically, PET resins having DEG levels of below 1.8 mole percent and no NDA crystallize too fast, have hazy preforms and do not form bottles. With naturally occurring DEG levels of above 2.2 mole percent and no NDA, the PET resins have polymer chains that are too flexible. With PET resins having naturally occurring DEG residues and NDA residues below 5 mole percent, preforms so made perform similar to normal DEG only because DEG at normal levels makes the polymer chains flexible and NDA modification at this level has no effect. Prior art levels of naturally occurring DEG levels with above 5 mole percent NDA residues are able to be hot-filled at high temperatures, but as noted earlier, this is expensive since NDA is a relatively high cost comonomer in addition to having a slower crystallization rate and higher stretch ratio.

In another comparison with the PET copolymer of the present invention, a prior art PET resin with DEG levels of about 1.6 mole percent and isophthalic acid (IPA) modification of above 2 mole percent had acceptable performance, however such resin could not achieve as high crystallinity compared to the PET copolymer of the present invention and could only be hot-filled at about 87° C. For above 90° C. hot-filling, prior art PET resins need to be double blow molded, contain more than 8 mole percent NDA or comprise a reheat agent.

In still another embodiment of the present invention, a process for hot filling a heat-set SBM container at temperatures above 87° C. comprises the steps of:
(1) conducting a single stage stretch blow molding process to form a container from a preform comprising the steps of:
    (a) heating a preform comprising a polyester to a temperature above the glass transition temperature of the polyester, (b) heating a container mold to a temperature of from about 60° C. to about 200° C., and preferably from about 90° C. to about 160° C., and more preferably from about 100° C. to about 140° C., (c) placing the heated preform into the heated mold, (d) injecting pressurized gas into the heated preform through an open end causing the heated preform to stretch and expand into the heated mold in a single step to form a container; and (e) cooling the container and (2) filling the container with a liquid at a temperature above 87° C.

Preferably, in step (2) the liquid is filled at a temperature above about 90° C. and more preferably above about 93° C. Preferably, a reheat additive such as iron oxide, a modified carbon or other reheat additives that are available to those skilled in the art, is added to the composition of the preform. In this embodiment the stretch blow molding process is only done once (in a single step) as opposed to the prior art process of double blow molding.

Another advantage of the present invention is in the ability to conduct the stretch blow molding process at higher blowing speeds than conventionally done. In the prior art, stretch blow molding processes run at speeds of about 600 to 1000 bottles/hour/mold (BPHM). In the present invention, speeds of 1200 BPHM are achievable with the use of a reheat agent such as iron oxide.

Thus, preferred embodiments of this invention provide improved PET hot-fill container performance as evidenced by reducing the weight of PET preforms and containers as a result of reduced wall thickness, reducing shrinkage at high filling temperatures, maintaining or improving the crystallinity of the sidewall of PET hot-fill containers without increasing the stretch ratio of preforms used to make the containers, and producing containers that exhibit adequate side wall thickness, thermal stability, and sidewall deflection characteristics.

Containers made in accordance with embodiments of this invention can be made by blow molding suitable preforms as explained above. Examples of suitable preform and container structures are disclosed in U.S. Pat. No. 5,888,598, the disclosure of which is expressly incorporated herein by reference in its entirety.

Turning to FIG. 1, a polyester container preform 10 is illustrated. This preform 10 is made by injection molding PET based resin and comprises a threaded neck finish 12 which terminates at its lower end at a capping flange 14. Below the capping flange 14 there is a generally cylindrical section 16 which terminates in a section 18 of gradually increasing external diameter so as to provide an increasing wall thickness. Below the section 18 there is an elongated body section 20.

Figure 2:
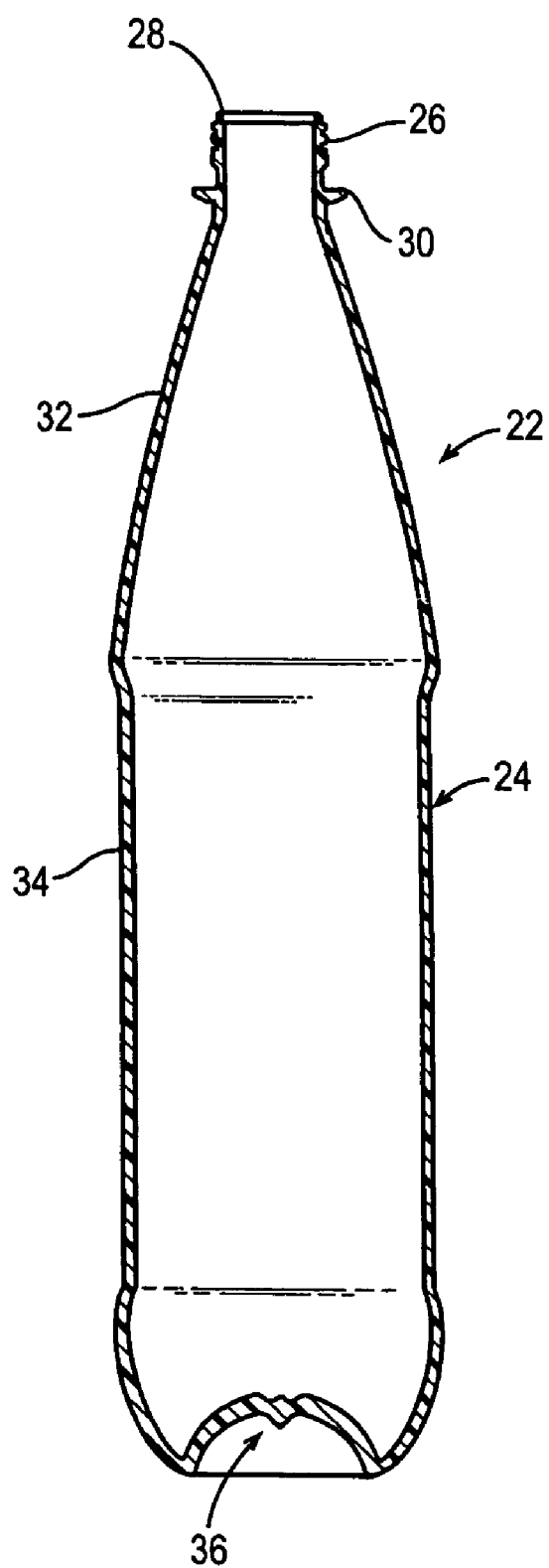
FIG. 2 is a sectional elevation view of a blow molded container made from the preform of FIG. 2 in accordance with an embodiment of this invention.
Figure 3:
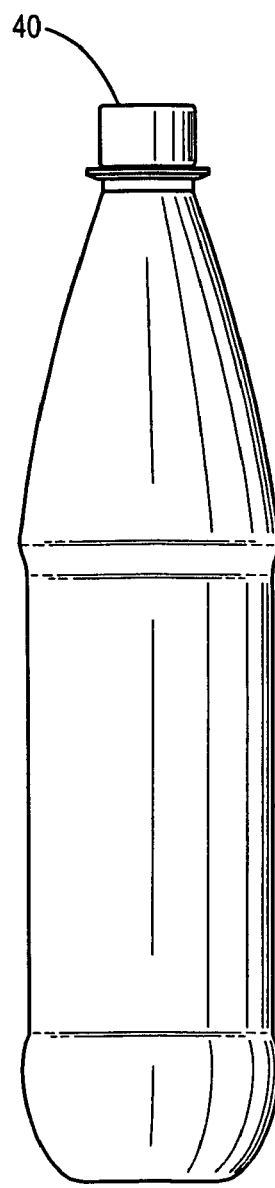
FIG. 3 is a perspective view of a packaged beverage made in accordance with an embodiment of this invention.

The preform 10 illustrated in FIG. 1 can be blow molded to form a container 22 illustrated in FIGS. 2 and 3. The container 22 comprises a shell 24 including a threaded neck finish 26 defining a mouth 28, a capping flange 30 below the threaded neck finish, a tapered section 32 extending from the capping flange, a body section 34 extending below the tapered section, and a base 36 at the body of the container. The container 22 is suitably used to make packaged beverages 38, as illustrated FIG. 3. The packaged beverage 38 includes a beverage such as a hot filled tea, juice, or sports drink disposed in the container 22 and a closure 40 sealing the mouth 28 of the container.

The preform 10, container 22, and packaged beverage 38 are but examples of applications of the present invention. It should be understood that the process of the present invention can be used to make preforms and containers having a variety of configurations.

Figure 4:
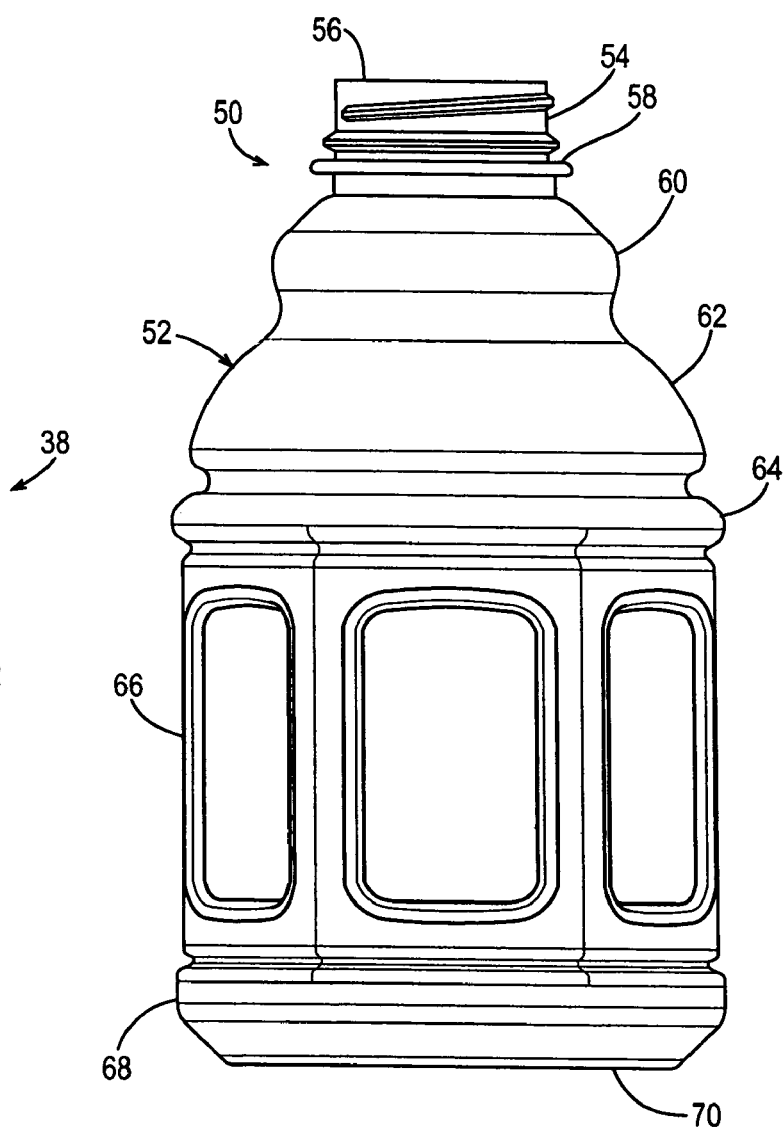
FIG. 4 is an elevation view of a blow molded container made in accordance with another embodiment of this invention, particularly suitable for measuring shrinkage of the container when hot filled.

One such alternative container 50 is illustrated in FIG. 4. This container 50 can also be blow molded from a preform, which is not illustrated but will be understood to those skilled in the art. The container 50 comprises a shell 52 comprising a threaded neck finish 54 defining a mouth 56, a capping flange 58 below the threaded neck finish, an upper bell 60 extending from the capping flange, a lower bell 62 extending from the upper bell, an upper bumper extending from the lower bell, a paneled body section 66 extending from the upper bumper, and a lower bumper 68 extending from the panel body section to a base 70. This embodiment is particularly useful for measuring shrinkage of the container after the container has been hot filled.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or scope of the appended claims.

EXAMPLE 1 AND COMPARATIVE EXAMPLE 1

In accordance with known PET copolymer synthesis, a PET copolymer resin, E1, having a formula in accordance with an embodiment of this invention and a control resin, C1, having a conventional formula with reduced DEG levels were made. The formulas of E1 and C1 were as follows:

E1 Composition

Diacid Repeat Units:
99.5 mole % of purified terephthalic acid (PTA)
0.5 mole % of 2,6 naphthalenedicarboxylic acid (NDA)

Diol Repeat Units:
98.62 mole % of ethylene glycol (EG)
1.38 mole % of diethylene glycol (DEG)
IV of the resin: 0.85 dL/g C1 Composition Diacid Repeat Units:
100 mole % PTA Diol Repeat Units:
98.6 mole % EG
1.4 mole % DEG
IV of the resin: 0.81 dL/g The E1 and C1 resins were dried for 4 hours at 149° C. to a moisture level of less than 50 ppm. The dried E1 and C1 resins were separately injection molded on a 49-g generic heat-set SBM preform tooling with an Arburg injection molding press to make bottle preforms with resin E1 and bottle preforms with resin C1. These preforms were blow molded to make bottles having the configuration illustrated in FIG. 4 using a 1-L generic heat-set SBM blow mold tooling on a Sidel SBO 2/3 blow molding machine. The preforms were heated to 107° C. prior to blow molding. The blow mold surface temperature was set at 121° C. at 1200 BPH (bottles per/hour).

5 bottles from each of resins E1 and C1 were filled at 85° C., 88° C., 91° C. and 93° C. and were measured at their critical dimensions before and after filling to determine the bottle dimensional changes as a result of hot filling. The volume shrinkage for each bottle was calculated using the relation: Volume shrinkage %=(Vi−Vf)/Vi*100%, wherein Vi and Vf are the bottle volumes before and after hot-filling. The average volume shrinkage was calculated for the 5 bottles and is shown in Table 1 below. The higher the shrinkage value, the higher the shrinkage and the worse the bottle performance. The higher shrinkage values make the bottle less acceptable.

TABLE 1

Comparison of the volume shrinkage % for the invention resin and the comparison resin at different filling temperatures.

| | Filling temperature (° C.) | | | |
|---|---|---|---|---|
| | 85 | 88 | 91 | 93 |
| E1 volume shrinkage | 1.32% | 1.93% | 2.07% | 3.36% |
| C1 volume shrinkage | 1.32% | 2.32% | 3.07% | 3.62% |

The diameter shrinkage for each of the 5 bottles made from E1 and C1 resins was calculated using the relation: Diameter shrinkage %=(Di−Df)/Di*100%, wherein Di and Df are the bottle diameters at the critical dimensions before and after hot-filling. The average diameter shrinkages were calculated for the 5 bottles and are listed in Table 2 below. The diameter shrinkages were measured at the upper bell, lower bell, and upper bumper of the bottles. The higher the shrinkage value means the higher the shrinkage and the worse the bottle performance. The higher shrinkage values make the bottle less acceptable.

TABLE 2

Comparison of the upper bell, lower bell, and upper bumper diameter shrinkage % for the invention resin and the comparison resin at different filling temperatures.

| | Filling temperature (° C.) | | | |
|---|---|---|---|---|
| | 85 | 88 | 91 | 93 |
| E1 upper bell volume shrinkage | 1.01% | 1.50% | 1.93% | 3.11% |
| C1 upper bell volume shrinkage | 1.01% | 2.79% | 3.74% | 6.12% |
| E1 lower bell diameter shrinkage | 1.01% | 1.45% | 1.76% | 2.90% |
| C1 lower bell diameter shrinkage | 1.01% | 1.93% | 2.51% | 4.24% |
| E1 upper bumper diameter shrinkage | 1.35% | 1.90% | 2.32% | 3.65% |
| C1 upper bumper diameter shrinkage | 1.35% | 1.61% | 2.25% | 3.67% |

5 bottles made from each of resins E1 and C1 were used to test the crystallinity of the bottle sidewall using ASTM D 1505-85. The higher the crystallinity of the resin means the faster the crystallization rate during the stretch blowing process and the higher the hot-fill stability. The results are shown in

TABLE 3

Crystallinity data.

| Sample Identification | Crystallinity Average |
|---|---|
| E1 | 28.9% |
| C1 | 27.0% |

Color and haze properties of bottles made with E1 and C1 resins were measured by testing six bottle sidewalls using a Hunter Labs Colorquest color meter. The results are in Table 4 below. The slightly less haze in the C1 resin is due to the fact that the E1 resin was a batch resin and the starting resin itself is less bright. The results showed that the E1 resin can produce very bright containers with little haze and the bottle is comparable to the one produced from the C1 control resin.

TABLE 4

Color and haze properties.

| Resin description | L | A | b | Haze |
|---|---|---|---|---|
| E1 | 94 | −0.15 | 2.1 | 7 |
| C1 | 95 | −0.09 | 1.3 | 6 |

EXAMPLE 2 AND COMPARATIVE EXAMPLE 2

In accordance with known PET copolymer synthesis, a PET copolymer resin, E2, having the same formula as E1 above, in accordance with an embodiment of this invention and a comparative PET copolymer resin, C2, having a conventional formula with reduced DEG content were made. The formulas of E2 and C2 were as follows:

E2 Composition

Diacid Repeat Units:
99.5 mole % of purified terephthalic acid (PTA)
0.5 mole % of 2,6 naphthalenedicarboxylic acid (NDA)

Diol Repeat Units:
98.62 mole % of ethylene glycol (EG)
1.38 mole % of diethylene glycol (DEG)
IV of the resin: 0.85 dL/g C2 Composition Diacid Repeat Units:
100 mole % PTA Diol Repeat Units:
98.6 mole % EG
1.4 mole % DEG
IV of the resin: 0.83 dL/g The E2 and C2 resins were dried for 4 hours at 149° C. to a moisture level of less than 50 ppm. The dried E2 and C2 resins were first separately injection molded on a 49-g generic heat-set SBM preform tooling with an Arburg injection molding press to make bottle preforms with resin E2 and bottle preforms with resin C2. The C2 resin could not be molded into preforms with acceptable clarity or haze. The preform was too thick and the crystallization rate of the C2 resin was too fast such that the preforms crystallized and formed haze. A lighter weight preform of 41-g had to be used. Both E1 and C2 resins were molded to 41 g preforms with acceptable clarity.

These 41 g preforms were blow molded to make bottles having the configuration illustrated in FIG. 4 using a 1-L generic heat-set SBM blow mold tooling on a Sidel SBO 2/3 blow molding machine. The preforms were heated to 107° C. prior to blow molding. The blow mold surface temperature was set at 121° C. at 1200 BPHM. Preforms made from the C2 resin could not be blown into acceptably performing bottles, while preforms made from resin E2 could. A reduced speed of 950 BPHM has to be used to blow mold bottles from preforms made with the C2 resin. For comparison purpose, a speed of 950 BPHM was used for both resins.

5 bottles made with each of resins E2 and C2 were filled at 85° C., 88° C., and 91° C. and were measured at their critical dimensions before and after filling to determine the bottle dimensional changes as a result of hot filling.

The volume shrinkage for each bottle was calculated using the relation: Volume shrinkage %=(Vi−Vf)/Vi*100%, wherein Vi and Vf are the bottle volumes before and after hot-filling. The average volume shrinkage was calculated for the 5 bottles and is shown in Table 5 below. The larger the number means the more the shrinkage and the less the bottle is acceptable.

TABLE 5

Comparison of the volume shrinkage % for the E2 resin and the C2 resin at different filling temperatures.

| | Filling temperature (° C.) | | |
|---|---|---|---|
| | 85 | 88 | 91 |
| E2 volume shrinkage | 0.80% | 1.26% | 1.97% |
| C2 volume shrinkage | 1.30% | 1.98% | 3.63% |

The diameter shrinkage for each bottle was calculated using the relation: Diameter shrinkage %=(Di−Df)/Di*100%, wherein Di and Df are the bottle diameter at the critical dimensions before and after hot-filling. The average diameter shrinkages were calculated for the 5 bottles and are listed in the Table 6 below. The higher the shrinkage value means the higher the shrinkage and the worse the bottle performance. The higher shrinkage values make the bottle less acceptable.

TABLE 6

Comparison of the upper bell, lower bell, and upper bumper diameter shrinkage % for the E2 resin and the C2 resin at different filling temperatures.

| | Filling temperature (° C.) | | |
|---|---|---|---|
| | 85 | 88 | 91 |
| E2 upper bell diameter shrinkage | 1.29% | 1.67% | 1.29% |
| C2 upper bell diameter shrinkage | 1.29% | 1.47% | 1.94% |
| E2 lower bell diameter shrinkage | 1.78% | 2.49% | 2.49% |
| C2 lower bell diameter shrinkage | 2.10% | 2.80% | 3.98% |
| E2 upper bumper diameter shrinkage | 1.73% | 2.37% | 2.86% |
| C2 upper bumper diameter shrinkage | 3.18% | 4.17% | 5.67% |

EXAMPLE 3 AND COMPARATIVE EXAMPLE 3

In accordance with known PET copolymer synthesis, a PET copolymer resin, E3, having the same formula as E1 above, in accordance with an embodiment of this invention and a comparative PET copolymer resin, C3, the best performing heat-set resin on the market and having a conventional formula with reduced DEG content were made. The formulas of E3 and C3 were as follows:

E3 Composition

Diacid Repeat Units:
99.5 mole % of purified terephthalic acid (PTA)
0.5 mole % of 2,6 naphthalenedicarboxylic acid (NDA)

Diol Repeat Units:
98.62 mole % of ethylene glycol (EG)
1.38 mole % of diethylene glycol (DEG)
IV of the resin: 0.85 dL/g C3 Composition Diacid Repeat Units:
97.2 mole % of PTA
2.8 mole % of isophthalic acid (IPA)

Diol Repeat Units:
98.4 mole % of EG
1.6 mole % of DEG
IV of the resin: 0.81 dL/g These examples demonstrated that a 41-g 1-L heat set bottle made from the E3 resin performed the same or better than a 45-g 1-L heat set bottle made from a conventional commercial resin, comparison resin C3.

The E3 and C3 resins were dried for 4 hours at 149° C. to a moisture level of less than 50 ppm. The dried C3 resin was injection molded on a 45 g generic heat-set SBM preform tooling with an Arburg injection molding press. The dried E3 resin was injection molded on a 41 g generic heat-set SBM preform tooling with an Arburg injection molding press. Both the resins E3 and C3 were injection molded with acceptable clarity. The E3 and C3 preforms were blow molded to make bottles having the configuration illustrated in FIG. 4 using a 1-L generic heat-set SBM mold tooling on a Sidel SBO 2/3 blow molding machine. The preform was heated to 107° C. prior to blow molding. The blow mold surface temperature was set at 121° C.

5 bottles made with each of resins E3 and C3 were filled at 85° C., 88° C., and 91° C. and were measured at their critical dimensions before and after filling to determine the bottle dimensional changes as a result of hot filling.

The volume shrinkage for each bottle was calculated using the relation: Volume shrinkage %=(Vi−Vf)/Vi*100%, wherein Vi and Vf are the bottle volumes before and after hot-filling. The average volume shrinkage was calculated for the 5 bottles and are shown in Table 7 below. The larger the number means the more the shrinkage and the less the bottle is acceptable.

TABLE 7

Comparison of the volume shrinkage % for the E3 resin and the C3 resin at different filling temperatures.

| | Filling temperature (° C.) | | |
|---|---|---|---|
| | 85 | 88 | 91 |
| E3 volume shrinkage | 0.80% | 1.26% | 1.97% |
| C3 volume shrinkage | 1.31% | 1.96% | 2.95% |

The diameter shrinkage for each bottle was calculated using the relation: Diameter shrinkage %=(Di−Df)/Di*100%, wherein Di and Df are the bottle diameters at the critical dimensions before and after hot-filling. The average diameter shrinkages were calculated for the 5 bottles and are listed in Table 8 below. The diameter shrinkages were measured at the upper bell, and the lower bell, and the upper bumper of the bottles. The higher the shrinkage value means the higher the shrinkage and the worse the bottle performance. The higher shrinkage values make the bottle less acceptable.

TABLE 8

Comparison of the upper bell, lower bell, and upper bumper diameter shrinkages % for the E3 resin and the C3 resin at different filling temperatures.

| | Filling temperature (° C.) | | |
|---|---|---|---|
| | 85 | 88 | 91 |
| E3 upper bell diameter shrinkage | 1.29% | 1.67% | 1.29% |
| C3 upper bell diameter shrinkage | 0.97% | 1.21% | 1.60% |
| E3 lower bell diameter shrinkage | 1.78% | 2.49% | 2.49% |

TABLE 8-continued

Comparison of the upper bell, lower bell, and upper bumper diameter shrinkages % for the E3 resin and the C3 resin at different filling temperatures.

| | Filling temperature (° C.) | | |
|---|---|---|---|
| | 85 | 88 | 91 |
| C3 lower bell diameter shrinkage | 1.47% | 2.14% | 3.18% |
| E3 upper bumper diameter shrinkage | 1.73% | 2.37% | 2.86% |
| C3 upper bumper diameter shrinkage | 2.23% | 3.28% | 4.80% |

It should be understood that the foregoing relates the particular embodiments of the invention, and that numerous changes can be made therein without departing from the scope of the invention as defined by the following claims.

I claim:

1. A process for hot filling a heat-set container comprising the steps of:
   (1) heating a preform comprising a PET copolymer to temperature from above the glass transition temperature of the PET copolymer to about 140 C, wherein the PET copolymer consists essentially of a diacid component having repeat units from about 95 to about 99.75 mole percent terephthalic acid and from about 5 to about 0.25 mole percent naphthalenedicarboxylic acid and a diol component having repeat units from greater than about 98.4 mole percent ethylene glycol and less than about 1.6 mole percent diethylene glycol, based on 100 mole percent diacid component and 100 mole percent diol component;
   (2) positioning the preform in a mold heated to a temperature from about 60 C to about 200 C;
   (3) stretching and expanding the heated preform into the heated mold to form a container;
   (4) cooling the container, and
   (5) filling the container with a liquid heated above 85 C.

2. A process as in claim 1 wherein the step of filling the container comprises filling the container with a liquid heated above 87° C.

3. A process as in claim 1 wherein the step of filling the container comprises filling the container with a liquid heated above 90° C.

4. A process as in claim 1 wherein the step of filling the container comprises filling the container with a liquid heated above 93° C.

5. A process as in claim 1 wherein the step of heating the preform comprises heating the preform to a temperature from about 90° C. to about 140° C.

6. A process as in claim 1 wherein the step of positioning the preform in a mold comprises positioning the preform in a mold heated to a temperature from about 90° C. to about 160° C.

7. A process as in claim 1 wherein the step of positioning the preform in a mold comprises positioning the preform in a mold heated to a temperature from about 100° C. to about 140° C.

8. A process as in claim 1 wherein the step of stretching and expanding comprises injecting a pressurized gas into the heated preform through an open end to stretch and expand the heated preform into the heated mold.

9. A process as in claim 1 wherein the diacid component has repeat units from about 97.5 to about 99.75 mole percent terephthalic acid and from about 2.5 to about 0.25 mole percent naphthalenedicarboxylic acid, wherein the mole percentages are based in 100 mole percent diacid component and 100 mole percent diol component.

10. A process as in claim 1 wherein the diacid component has repeat units from about 99.0 to about 99.75 mole percent terephthalic acid and from about 1.0 to about 0.25 mole percent naphthalenedicarboxylic acid, wherein the mole percentages are based in 100 mole percent diacid component and 100 mole percent diol component.

11. A process as in claim 1 wherein the diacid component has repeat units from about 99.25 to about 99.75 mole percent terephthalic acid and from about 0.75 to about 0.25 mole percent naphthalenedicarboxylic acid, wherein the mole percentages are based in 100 mole percent diacid component and 100 mole percent diol component.

12. A process as in claim 1 wherein the diol component has repeat units from greater than about 98.6 mole percent ethylene glycol and less than about 1.4 mole percent diethylene glycol, wherein the mole percentages are based in 100 mole percent diacid component and 100 mole percent diol component.

13. A process as in claim 1 wherein the naphthalenedicarboxylic acid is 2,6-naphthalenedicarboxylic acid.

14. A process as in claim 1 wherein the PET copolymer has an intrinsic viscosity from about 0.6 to about 1.2 dL/g.

15. A process as in claim 1 wherein the PET copolymer has an intrinsic viscosity from about 0.7 to about 0.9 dL/g.

16. A process as in claim 1 wherein the PET copolymer has an intrinsic viscosity from about 0.76 to about 0.87 dL/g.

17. A process as in claim 1 wherein the preform comprises a closed base forming portion, an open ended mouth forming portion, and a body forming portion extending from the base to the open ended mouth forming portion.

18. A process as in claim 1 wherein the container comprises a closed base, an open ended mouth, and a body extending from the base to the open ended mouth.

* * * * *